United States Patent [19]

Duksa

[11] Patent Number: 5,117,693
[45] Date of Patent: Jun. 2, 1992

[54] LIQUID LEVEL SENSOR

[76] Inventor: Thomas R. Duksa, 343 East St., Wolcott, Conn. 06716

[21] Appl. No.: 714,696

[22] Filed: Jun. 13, 1991

[51] Int. Cl.⁵ .................. G01F 23/38; H01H 35/18; H01H 36/02
[52] U.S. Cl. .................. 73/317; 73/DIG. 5; 73/313; 340/625
[58] Field of Search ............... 340/623, 625; 73/317, 73/DIG. 5, 313

[56] References Cited

U.S. PATENT DOCUMENTS

| | | | |
|---|---|---|---|
| 2,671,834 | 3/1954 | Kmiecik | 73/DIG. 5 |
| 3,820,098 | 6/1974 | Demyon et al. | 340/625 |
| 3,932,853 | 1/1976 | Cannon | 340/625 |
| 4,091,365 | 5/1978 | Allen | 340/625 |
| 4,361,039 | 11/1982 | van der Lely | 73/317 |
| 4,399,338 | 8/1983 | Jones | 340/625 |
| 4,557,144 | 12/1985 | Lucchini | 73/317 |
| 4,746,776 | 5/1988 | Komaniak | 73/317 |
| 5,006,834 | 4/1991 | Fountain | 340/625 |

FOREIGN PATENT DOCUMENTS 46-24213  7/1971  Japan .................. 340/625

Primary Examiner—William A. Cuchlinski, Jr.
Assistant Examiner—Diego F. F. Gutierrez
Attorney, Agent, or Firm—Chilton, Alix & Van Kirk

[57] ABSTRACT

A liquid level detector includes a pivotally mounted bent arm which supports, adjacent opposite ends thereof, a float and a component of a signal generator. As the level of a fluid contacted by the float rises and falls, the opposite end of the arm will move into proximity to or away from a support. The second component of the signal generator is mounted on the support and a signal indicative of the juxtapositioning of the second end of the arm to the float will be generated.

19 Claims, 3 Drawing Sheets

LIQUID LEVEL SENSOR

BACKGROUND OF THE INVENTION

1. Field of the Invention

The present invention relates to the generation of an electrical signal commensurate with the level of a liquid and particularly to the determination of a fill state of interest for a liquid disposed in a container. More specifically, this invention is directed to a liquid level detector and especially to an actuator for a proximity type switch, the actuator being responsive to the level of a contained liquid. Accordingly, the general objects of the present invention are to provide novel and improved methods and apparatus of such character.

2. Description of the Prior Art

There are many situations where the level of a liquid within a container must be sensed in order to provide a warning or initiate an action when the level reaches a critical state, typically a "full" or "empty" state of the container. By way of example, it may be necessary to sense a "full" condition to initiate operation of a sump pump or it may be necessary to sense an "empty" condition in order to initiate replenishment of the fluid in a reservoir. Many liquid level responsive devices are known in the prior art. The known level responsive devices typically provide an output signal commensurate with one or more positions of a float which moves vertically as the level of liquid in a container rises and falls. For a very early version of a liquid level indicator which includes a float, reference may be had to Patent 531,106.

With the advent of reliable proximity switches, i.e., switches responsive to a magnetic field such as produced by a permanent magnet, liquid level indicating devices which utilized such switches were introduced. For examples of such level indicators which employ proximity or "reed" switches, reference may be had to Pat. Nos. 3,678,232 and 3,826,139. In the known liquid level detectors which employ proximity switches, a magnet will typically be incorporated into the float while the switch which cooperates therewith will be permanently secured adjacent the path of float travel at a level commensurate with the liquid level of interest. While very successful, the prior art liquid level sensors which employ proximity switches have been characterized by certain disabilities and disadvantages. For example, most of the prior art liquid level sensors which employ proximity switches employed a float which travels on a vertically oriented guide stem. Thus, both the float and the guide along which it travels are immersed in the liquid and are subject to contamination. The build-up of particulate matter on the float and/or stem has been a particularly prevalent problem which, when it occurs, causes the float to jam on the stem thus disabling the sensor. In those cases where an attempt has been made to mount the float of a level detector for movement other than in a vertical direction, the float has typically been hinged on a pin and both the float and pin have been in contact with the fluid. Thus, the non-vertical movement of the float has not solved the problem of contamination and subsequent jamming of the actuators of level detectors employing proximity switches.

Continuing to discuss the prior art, and as may be seen by reference to Pat. No. 3,826,139, the previous practice of mounting the magnet on the float results in both of the components of the sensor, i.e., the magnetic field generator and the field responsive signal generator, being exposed to conditions prevalent in the liquid. These conditions may include a very high or a very low temperature which can effect performance and, particularly, cause sufficient distortion of the contacts of the reed switch as to prevent operation. This potential problem is not overcome by reversal of the position of the field generator and signal generator.

In many operating environments a liquid level detector will be mounted from the wall of a container. In such installations the container wall is perforated to permit the mounting and/or to permit the completion of an electrical circuit to the switch of the level sensor. In many cases the liquid confined in the container will be at a significantly different temperature relative to the ambient environment about the container, the ambient environment consisting of a fluid which may be either gas or a liquid. This temperature difference may cause differential expansion or contraction between the sensor mounting and the container wall. Since the sensor will be immersed in the liquid within the container, any such differential expansion or contraction may result in leakage. Leakage may also result from deterioration of the seals about the perforation in the container wall if the liquid being contained reacts with the joint compound.

Yet another persistent problem with prior art liquid level sensors resides in the fact that they have historically performed poorly in highly viscous environments. This poor performance has resulted from the sticking of the floats on their associated stems or because the viscosity has otherwise prevented relative movement between the magnet and switch.

SUMMARY OF THE INVENTION

The present invention overcomes the above briefly discussed and other deficiencies and disadvantages of the prior art by providing a novel and improved liquid level detector. A level detector in accordance with the invention may be installed in such a manner that the only component of the detector assembly which contacts the confined liquid, the level of which is to be sensed, is a float. Thus, a level detector in accordance with the present invention, in a preferred embodiment, includes an elongated support member which is mounted on the interior of a container. Also in a preferred embodiment, an electrical device which will provide a signal in response to a magnetic field, a proximity switch for example, is affixed to the support member. A comparatively large diameter axle defining member is pivotally mounted on the support member. A bent arm is affixed to the axle defining member and carries, at a first end, a magnet. The sensor float is affixed to the second end of the bent arm. The bent arm will be sized and shaped such that the float will normally be in contact with the liquid in the container and, accordingly, will move as the level of the liquid rises and falls. By suitably sizing and shaping the arm and adjusting the point at which the arm is affixed to the axle defining member, the magnet can be brought into proximity to the switch or other signal generator in the support member when the surface of the liquid in the container is at the level of interest. Thus, an electrical signal which is indicative of whether the liquid in the container is at that level of interest will be generated. The nature of that signal will be a function of the switch logic, i.e., normally open or normally closed, employed. Also, depending upon the construction of the detector, the rotational movement of the axle defining member on the support member in response to the rising or falling level of the liquid will result in the signal generator changing state when the liquid level reaches and/or departs from a level of interest. A stop member, which engages the support member, may be secured to the axle defining member to stop the movement of the axle defining member, and thus the arm and the components carried thereby, after a predetermined degree of rotation.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENT

Figure 1:
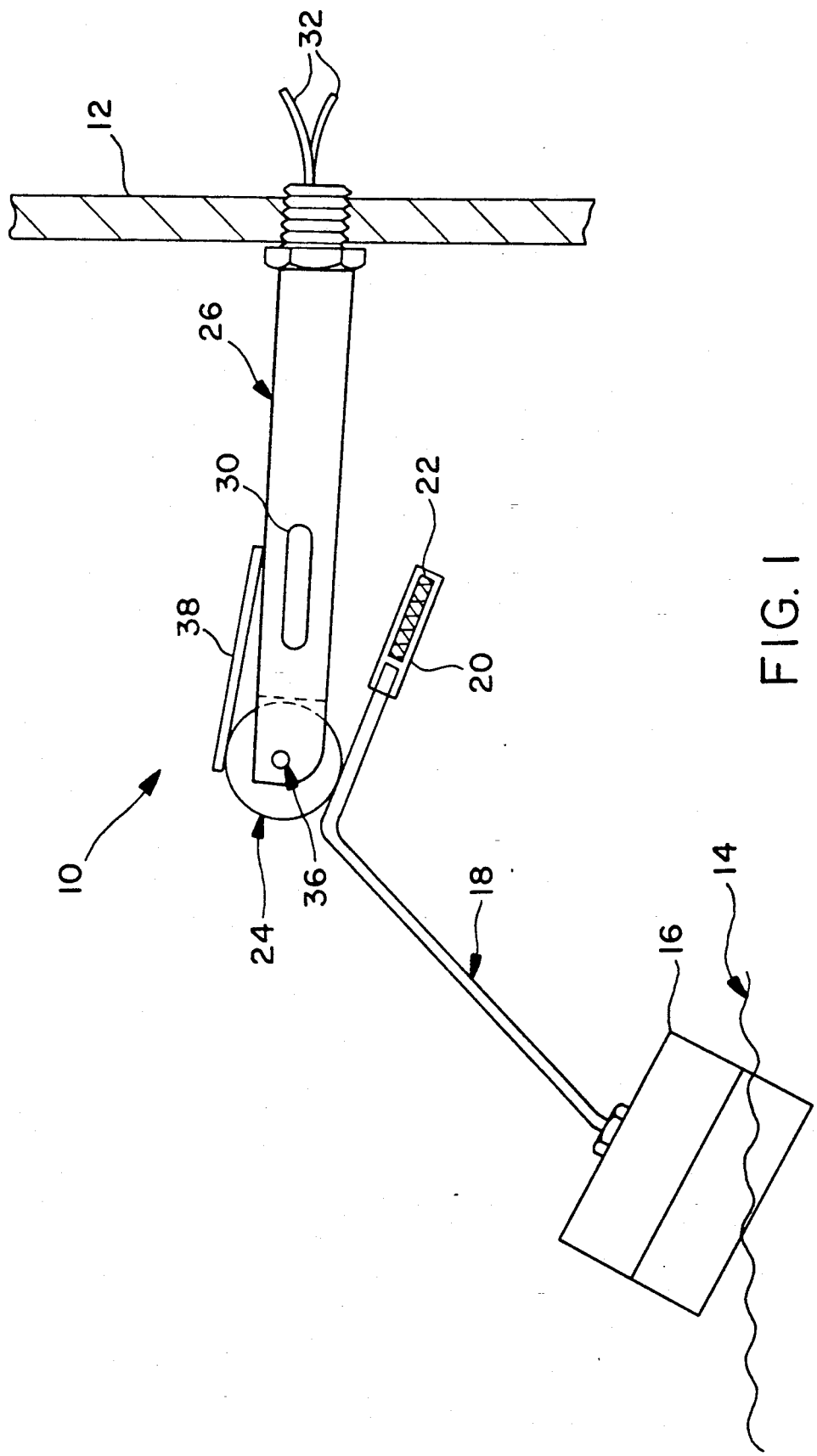
FIG. 1 is a schematic, side elevation view of a level detector in accordance with a preferred embodiment of the invention, FIG. 1 depicting the detector in the condition where the level of the liquid being monitored is such that the detector is not producing an output signal.

With reference now to the drawings, a level detector in accordance with the present invention is indicated generally at 10. Level detector 10 is depicted as being mounted from the wall 12 of a reservoir in which a liquid, indicated generally at 14, is contained. The level of the surface of the liquid 14 will, of course, rise and fall as liquid is withdrawn from reservoir 12 for use and as the liquid in the reservoir is subsequently replenished.

The level detector 10 comprises a float 16 which is mounted on a first free end of an elongated bent arm 18. A housing 20, which in the disclosed embodiment contains a permanent magnet 22, is secured to the second end of arm 18. Arm 18, at a point disposed on the magnet side of the bend therein, is tangential with and secured to an axle defining member 24 by any suitable technique. In one reduction to practice of the invention, the arm 18 was affixed to axle defining member 24 by means of a fusion bond.

The level detector 10 also comprises an elongated support member, indicated generally at 26. In the disclosed embodiment, the support member 26 is in the form of a tube comprised of non-magnetic material. Support member 26, as may be seen from FIGS. 1 and 2, has a length which exceeds its diameter and extends into the reservoir 12 and is secured to the reservoir wall by any suitable coupling means 28. In most applications, the coupling means 28 will establish a fluid type connection between the interior of the support member 26 and the exterior of the reservoir. A magnetic field responsive signal generator, which is a reed type proximity switch 30 in the disclosed embodiment, is mounted within the support member 26. In a typical installation, the signal generator 30 will be positioned within the tubular support member and the support member will then be filled with a potting compound. The electrical leads through which a circuit including the signal generator 30 is established are indicated at 32 and will extend through the coupling 28 and the potting compound within the support member 26.

The support member 26, at the end thereof which is remote from the reservoir wall 12, defines a yoke or fork having a pair of spatially displaced legs 34. This yoke can be formed from the tubular member which defines the support 26 or can be a separate element which is affixed thereto. In either event, the tubular support member 26 will typically be capped at the base of the yoke. The axle defining member 24 is inserted between the legs of the yoke and secured in place by a split pivot pin 36. Accordingly, axle defining member 24 will be free to rotate. As may also be seen from FIGS. 1 and 2, axle defining member 24 has, in a direction measured transversely with respect to the pivot axis defined by pin 36, a diameter which is greater than the cross-section of support member 26 measured in the same direction.

In the disclosed embodiment, a stop rod 38 is also affixed to the axle defining member 24. Stop rod 38 is sized and configured so as to contact the support member 26 thus limiting the movement of the axle defining member, and thus of the float 16, in a first direction.

The level detector of the present invention is depicted in an environment where it is utilized to generate a signal commensurate with an "empty" condition of the reservoir 12. Thus, in FIG. 1, the level detector is shown with the reservoir in the "full" condition. In this condition the float has moved upwardly causing the axle defining member 24 to pivot on pin 36 in the clockwise direction. The magnet 22 has, accordingly, moved away from the support member 26 and thus away from the magnetic field responsive signal generator 30. In the FIG. 1 position, further upward movement of the float is prevented by the stop rod 38 contacting the support member 26. As will be appreciated by those skilled in the art, it would be possible to include a second signal generator in the level detector to indicate the "full" condition of the reservoir. Such a second signal generator could be a second proximity switch mounted in the support member 26 at a point remote from signal generator 30. A second switch, if provided, would be operated by a magnet carried by the stop rod 38 which, of course, would be elongated. With the device in the condition depicted in FIG. 1, and presuming the field responsive signal generator is a normally open reed switch, no current will be flowing in the circuit which includes the signal generator 30. Obviously, a switch with normally closed contacts could also be employed.

Figure 2:
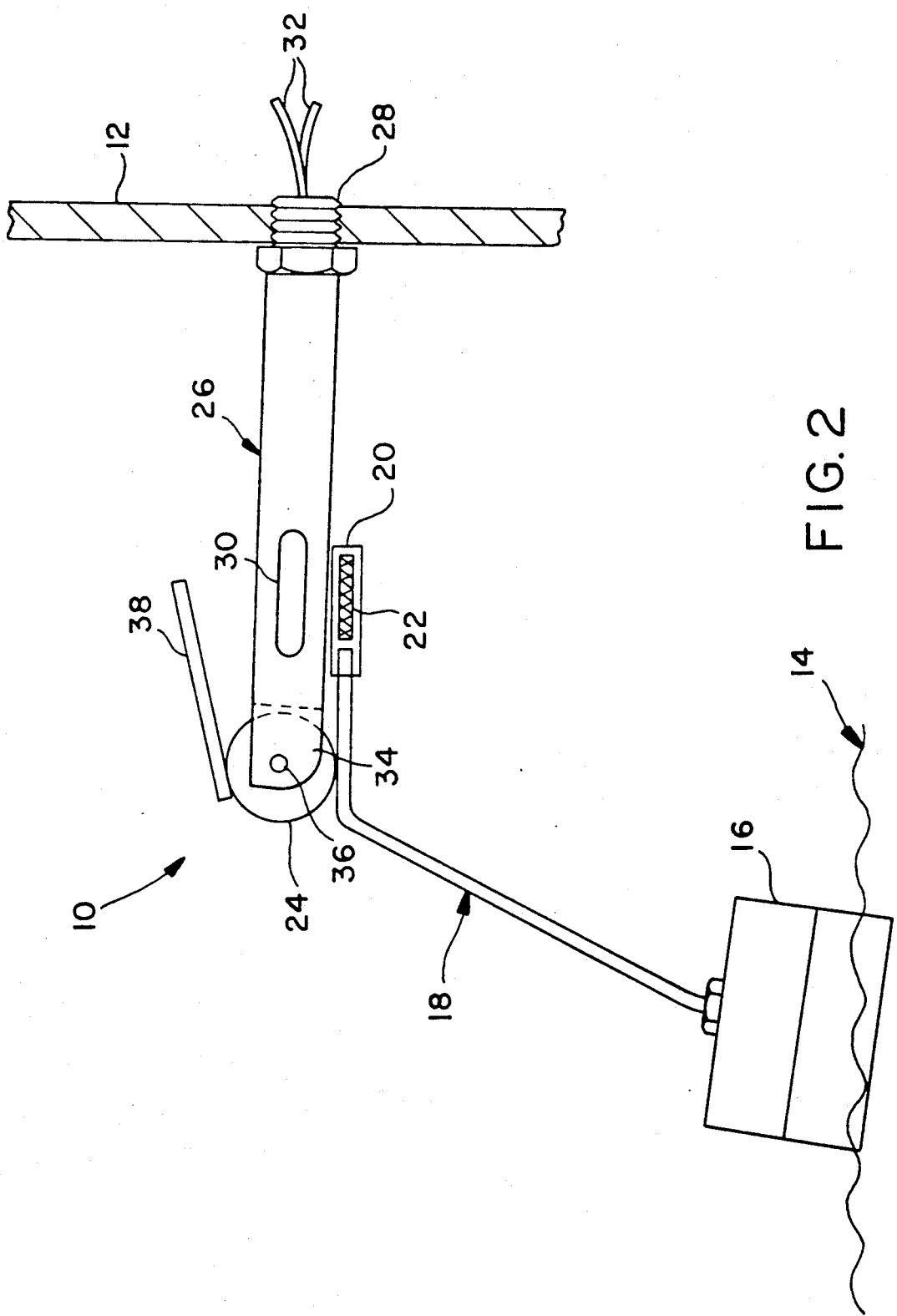
FIG. 2 is a view similar to FIG. 1 showing the level detector in a second condition where an output signal commensurate with a condition of interest is being generated.
Figure 3:
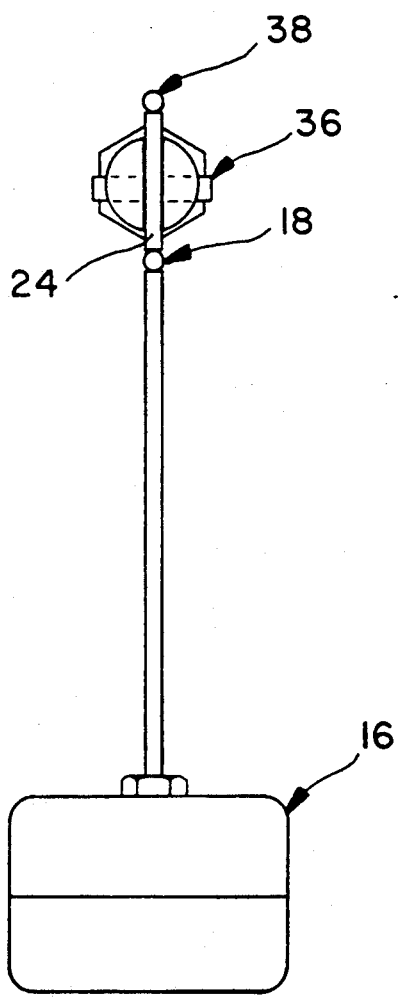
FIG. 3 is a further view of the level detector of FIGS. 1 and 2, FIG. 3 being a view taken from the right side as the devices are viewed in FIGS. 1 and 2.

Referring to FIG. 2, the level detector is shown with the reservoir 12 in the "empty" condition, i.e., a condition where it is desired to generate a signal indicating a need to replenish the liquid in the reservoir. As may be seen from comparison of FIGS. 1 and 2, as the level of the liquid in the reservoir has fallen, the float 16 will have moved downwardly causing the axle defining member 24 to rotate in the counterclockwise direction. This counterclockwise rotation will result in the magnet 22 moving into proximity with the signal generator 30 whereupon the magnet field will cause the field responsive signal generator to change state. In the example being described where the signal generator is a reed switch with normally open contacts, the switch contacts will close in response to the movement of the magnet 22 into proximity to the signal generator 30 and current will flow in the circuit which includes the signal generator.

As should be obvious from the above discussion and the drawings, the only component of a level detector in accordance with the present invention which is in contact with the liquid being monitored is the float. Accordingly, there is no danger of contamination of the moving parts of the device which will interfere with the requisite movement. Similarly, those components which might be deleteriously affected by the working environment, particularly temperature extremes or contaminants, are not in contact with the liquid in the reservoir and thus the level detector is inherently more reliable than prior art devices of similar character.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A liquid level detector comprising:
    a tubular support member, said support member being adapted for mounting from the inner wall of a container which is intended to hold a liquid, said support member being provided with a yoke at a first end thereof, said support member having a length which exceeds its maximum width measured transversely to its length;
    an axle defining member rotatably supported within said yoke, said axle defining member being rotatable about an axis, said axle defining member having a peripheral surface which extends outwardly from said axis a greater distance than the said yoke;
    an elongated arm, said arm having a pair of oppositely disposed ends, said arm being affixed to said axle defining member peripheral surface intermediate said oppositely disposed ends;
    signal generator means, said signal generator means including means for producing a magnetic field and means responsive to a magnetic field for generating an electrical signal, one of said means for producing a magnetic field and generating an electrical signal being positioned within said tubular support member and the other of said means for producing a magnetic field and generating an electrical signal being mounted on said arm at a first side of the point of affixation thereof to said axle defining member peripheral surface; and
    float means affixed to said arm on a second side of the point of affixation thereof to said axle defining member, said first and second sides of said arm being oppositely disposed with respect to said axle defining member, said float means being positioned to contact liquid in the container whereby the position of said float means will be a function of the level of the liquid, movement of said float means being transmitted via said arm and axle defining member to the said other of said means for producing a magnetic field and means for generating an electrical signal whereby the spacing between said means for producing a magnetic field and for generating an electrical signal will vary with the level of the liquid.

2. The level detector of claim 1 wherein said arm is provided with a bend on at least one side of the point of affixation thereof to said axle defining member surface, the length of said arm and the angle of said bend being selected such that the closest proximity of said means for producing a magnetic field to said means for generating an electrical signal will occur when the level of the liquid is at a first level of interest.

3. The level detector of claim 2 wherein said bend is located on the same side of said point of affixation as said float means.

4. The level detector of claim 3 wherein said axle defining member peripheral surface has an arcuate shape and wherein said arm is tangentially oriented with respect to said axle defining member surface at the point of affixation thereto.

5. The level detector of claim 1 wherein said peripheral surface of said axle defining member has an arcuate shape and wherein said arm is tangentially oriented with respect to said axle defining member surface at the point of affixation thereto.

6. The level detector of claim 1 wherein said means for generating an electrical signal is mounted in said tubular support member and wherein said means for producing a magnetic field is mounted on said arm.

7. The level detector of claim 1 further comprising stop means for limiting the movement of said float means in a first direction.

8. The level detector of claim 7 wherein said stop means is affixed to said axle defining member and cooperates with said tubular support member.

9. The level detector of claim 1 wherein said means for producing a magnetic field comprises a permanent magnet, said permanent magnet being mounted on said arm, and wherein said means for generating an electrical signal comprises a proximity switch, said magnet being juxtapositioned to said tubular support member as a result of interaction between said float means and liquid in the container when the liquid is at a first level of interest.

10. The level detector of claim 9 wherein said arm is provided with a bend on at least one side of the point of affixation thereof to said axle defining member surface, the length of said arm and the angle of said bend being selected such that the closest proximity of said permanent magnet to said proximity switch will occur when the level of the liquid is at a first level of interest.

11. The level detector of claim 10 wherein said bend is located on the same side of said point of affixation as said float means.

12. The level detector of claim 11 wherein said axle defining member peripheral surface has an arcuate shape and wherein said arm is tangentially oriented with respect to said axle defining member surface at the point of affixation thereto.

13. The level detector of claim 12 further comprising stop means for limiting the movement of said float means in a first direction.

14. The level detector of claim 13 wherein said stop means is affixed to said axle defining member and cooperates with said tubular support member.

15. A liquid level detector comprising;
    a support member, said support member being adapted for mounting from the inner wall of a container which is intended to hold a liquid;
    an axle defining member mounted on such support member for rotation about an axis, said axle defining member having a peripheral surface;
    an elongated arm, said arm having a pair of oppositely disposed ends, said arm being affixed to said axle defining member peripheral surface at a point located intermediate said oppositely disposed ends;
    signal generator means, said signal generator means including means for producing a magnetic field and means responsive to a magnetic field for generating an electrical signal, one of said means for producing a magnetic field and means for generating an electrical signal being mounted on said support member and the other said means for producing a magnetic field and means for generating an electrical signal being mounted on said arm at a first side of said point of affixation thereof to said axle defining member peripheral surface;

float means affixed to said arm at a point on the second side thereof, said second side of said arm being disposed at the opposite side of said point of affixation to said axle defining member surface with respect to said arm first side, said float means contacting the liquid in the container, the position of said float means being a function of the level of the liquid, movement of said float means being transmitted via said arm and said axle defining member to the said one of said means for producing a magnetic field and means for generating an electrical signal whereby the spacing between said means for producing a magnetic field and said means for generating an electrical signal will vary with the level of the liquid; and stop means for limiting the movement of said float means in a first direction, said stop means being affixed to said axle defining member and cooperating with said support member.

16. The level detector of claim 15 wherein said support means comprises a tubular member, said tubular member being provided with a yoke at a first end thereof, said axle defining member being supported within said yoke, said one of said means for producing a magnetic field and means for generating an electrical signal being positioned within said tubular member.

17. The level detector of claim 16 wherein said axle defining member peripheral surface has an arcuate shape and wherein said arm is tangentially oriented with respect to said axle defining member surface at the point of affixation thereto.

18. The level detector of claim 17 further comprising stop means for limiting the movement of said float means in a first direction.

19. The level detector of claim 15 wherein said magnetic field producing means comprises a permanent magnet, said permanent magnet being mounted on said arm, and wherein said means for generating an electrical signal comprises a proximity switch, said magnet being juxtapositioned to said switch as a result of interaction between said float means and liquid in the container when the liquid is at a first level of interest.

* * * * *